United States Patent [19]

Yeom et al.

[11] Patent Number: 5,327,323
[45] Date of Patent: Jul. 5, 1994

[54] HARD DISK COMPATIBLE SYSTEM INCLUDING BRACKET, GUIDE RAILS, AND INTEFACE BOARD

[75] Inventors: Yunpil Yeom; Keesoon Park, both of Seoul, Rep. of Korea

[73] Assignee: Samsung Electronics Co., Ltd., Kyunggi, Rep. of Korea

[21] Appl. No.: 991,859

[22] Filed: Dec. 15, 1992

[30] Foreign Application Priority Data

Apr. 16, 1992 [KR] Rep. of Korea ............... 92 6300[U]

[51] Int. Cl.$^5$ ........................... H05K 7/10; G06F 1/16
[52] U.S. Cl. .................................... 361/685; 361/727; 439/377; 439/638
[58] Field of Search .................. 360/97.01, 98.01, 137; 439/76, 374, 377, 928, 638; 361/380, 390–395, 399, 679–686, 724–727; 312/223.2; 364/708, 708.1

[56] References Cited

U.S. PATENT DOCUMENTS

| | | | |
|---|---|---|---|
| 4,545,047 | 10/1985 | Rickert | 369/290 |
| 4,717,982 | 1/1988 | Toreson et al. | 360/137 |
| 4,941,841 | 7/1990 | Darden et al. | 364/708 X |
| 5,155,662 | 10/1992 | I-Shou | 361/392 |

Primary Examiner—Leo P. Picard
Assistant Examiner—Michael W. Phillips
Attorney, Agent, or Firm—Christie, Parker & Hale

[57] ABSTRACT

In order to transmit easily the information in a hard disk of a first computer to that of a second computer having a different system from the first computer, a hard disk compatible system is provided for directly moving a hard disk for notebook computer to a desk top computer or from a desk top computer to a notebook computer by means of a holder without the use of floppy disks. The system includes a body wherein guide rails are formed to be fitted on a desk top computer, and, corresponding to this, a bracket having bracket guides is fixed on it. Attaching a hard disk guide and an interface board thereto, an inserting portion suitable for the size of a hard disk of the notebook computer is fitted on the front surface of the bracket in such a manner that the hard disk can be easily and snugly inserted and removed to facilitate the interchange of the information, in accordance with this invention.

3 Claims, 2 Drawing Sheets

HARD DISK COMPATIBLE SYSTEM INCLUDING BRACKET, GUIDE RAILS, AND INTEFACE BOARD

BACKGROUND OF THE INVENTION (1) Field of the Invention

The present invention relates to a hard disk compatible system, and more particularly to a hard disk compatible system for notebook computers and desk top computers which facilitates the interchange of information between computers having different systems simply by inserting and removing a hard disk from one computer and transferring the hard disk and the information on it to a second computer having a different system.

(2) Description of the Related Art

Generally, a hard disk having the size of 5.25, 3.5 or 2.5 inches used as an auxiliary memory device in a computer is installed to be suitable for each particular computer system, and while a hard disk of 5.25 or 3.5 inches is commonly used for a desk top computer, a hard disk of 2.5 inches is commonly used for a notebook computer.

The difference in size of the hard disks used for desk top computers and notebook computers resulted from the development of smaller-sized computers that could house only disks of a particular size.

In order to reduce the size of a computer body, the hard disk installed in the computer body should be small, if possible. Usually, the hard disk of 2.5 inches is not used for a desk top computer. That is because manufacturing a hard disk to be thin and minimized in size is so difficult that it causes high production casts. Also, there is no particular need to install a small-sized hard disk in a relatively larger desk top computer.

If a user has to carry a notebook computer to use during a business trip, the information stored in the desk top computer often must be transmitted to the notebook computer. In order to transmit the information in the desk top computer to the notebook computer, the information often must be stored in duplicate by means of floppy disks compatible with each computer. This inconvenience arises from the differences in hard disks respectively used for the desk top computer and notebook computer, as mentioned above.

This problem can occur between any computers having different systems from one other such as, for example, a desk top computer and a pen computer, a notebook computer and a pen computer, etc., as well as between the notebook computer and a desk top computer, as mentioned above.

SUMMARY OF THE INVENTION

An object of this invention is to provide a hard disk compatible system that can transmit the information in a hard disk of a first computer to that of a second computer having a different system from the first computer.

Another object of this invention is to provide a hard disk compatible system that has no need to store the same information in duplicate and can also reduce costs because a user having computers with different system need only buy one hard disk compatible system and use it for both computers by transmitting the information from one computer to the other.

In order to obtain the above objects, the present invention provides a hard disk compatible system comprising:

a bracket slidably fitted on a body having a plurality of pairs of guide rails fixed on a sash of a first computer, and including a bracket guide;

a hard disk guide attached to the inside of a vertical portion of the bracket, and supporting a hard disk of a second computer;

an inserting portion formed in the front side of the bracket, and including a deck to which a hard disk is inserted and a recess for removal of the hard disk; and an interface board fitted in a connective portion of the hard disk guide inside the bracket, and including connectors.

Additionally, an expansion portion may be formed on the opposite side of the connective portion of the hard disk guide to easily insert and remove a hard disk, and the bracket guide may include a curved portion bent inward on one of the side surfaces of the bracket guide that is first fitted in the bracket.

The first computer and the second computer are selected from among the group of a desk top computer, a notebook computer, a pen computer, or a palm computer.

BRIEF DESCRIPTION OF THE DRAWINGS

The above and further objects, features and advantages of the present invention will become more apparent from the following detailed description of embodiments taken in conjunction with the accompanying drawings, wherein.

DETAILED DESCRIPTION OF THE INVENTION

Figure 1:
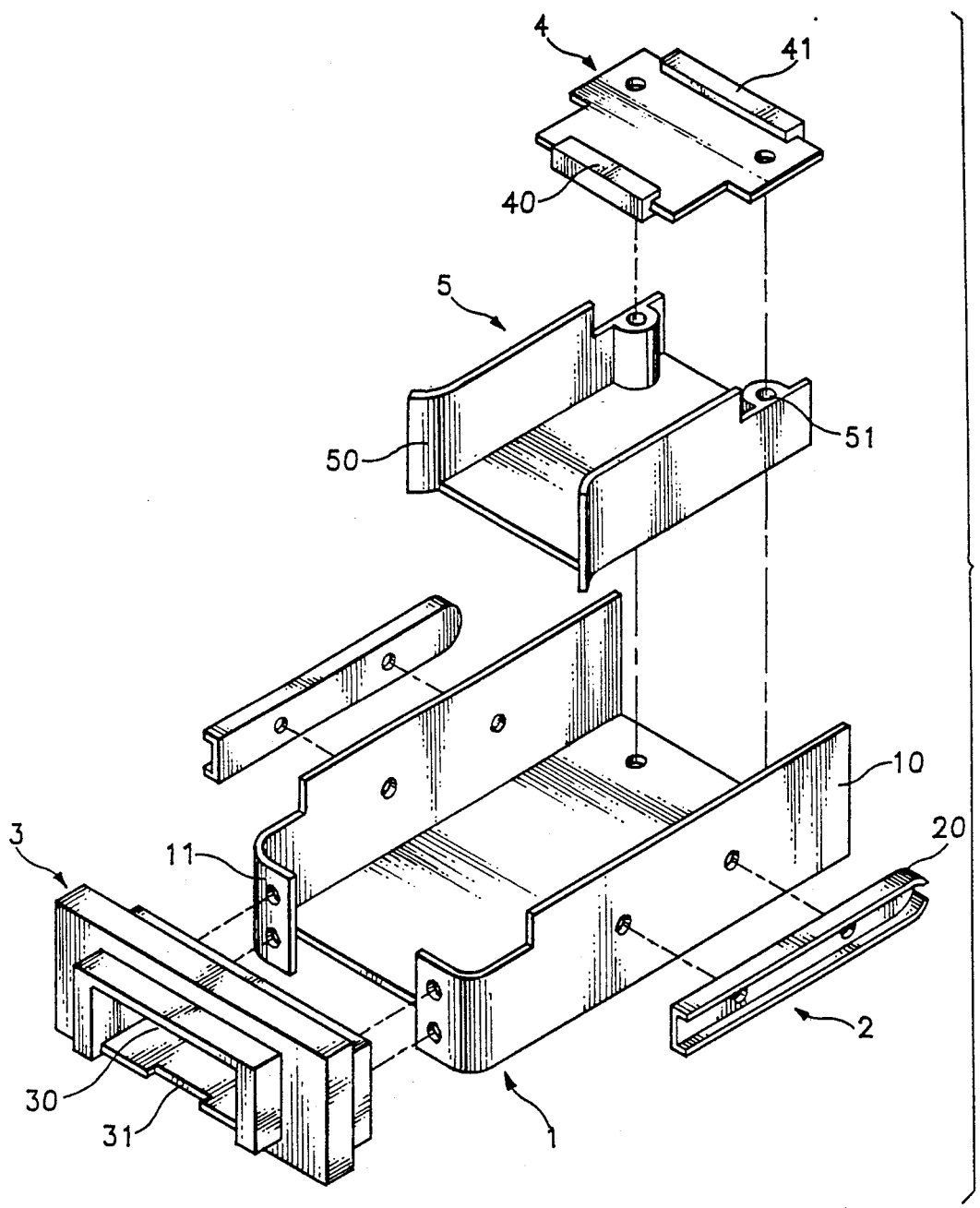
FIG. 1 is an exploded perspective view showing main parts of a hard disk compatible system in accordance with a first embodiment of the present invention.

FIG. 1 is an exploded perspective view showing main parts of a hard disk compatible system for a desk top computer and notebook computer, in accordance with a first embodiment of the present invention. Bracket guides 2 are fitted in both sides of a vertical portion 10 of a bracket 1. An inserting portion 3 to which a hard disk H (FIG. 2) is inserted adheres to a front portion 11 of the bracket 1. A hard disk guide 5 to which an interface board 4 is attached is fitted inside bracket 1. Curved portions 20 are formed on one side surface of the bracket guides 2 to facilitate insertion. A deck 30 for insertion of the hard disk H and a recess 31 for easy removal of the hard disk H are formed in the inserting portion 3, and an expansion portion 50 is formed on the inlet of the hard disk guide 5 to facilitate insertion of the hard disk H (FIG. 2).

Further, connectors 40 and 41 that coupled to the hard disk H (FIG. 2) and an internal controller are formed in the interface board attached to the hard disk guide 5. A connective portion 51 to which a customary bolt may be inserted is formed on the opposite side of the expansion portion 50 to attach the interface board 4 to the hard disk guide 5.

Figure 2:
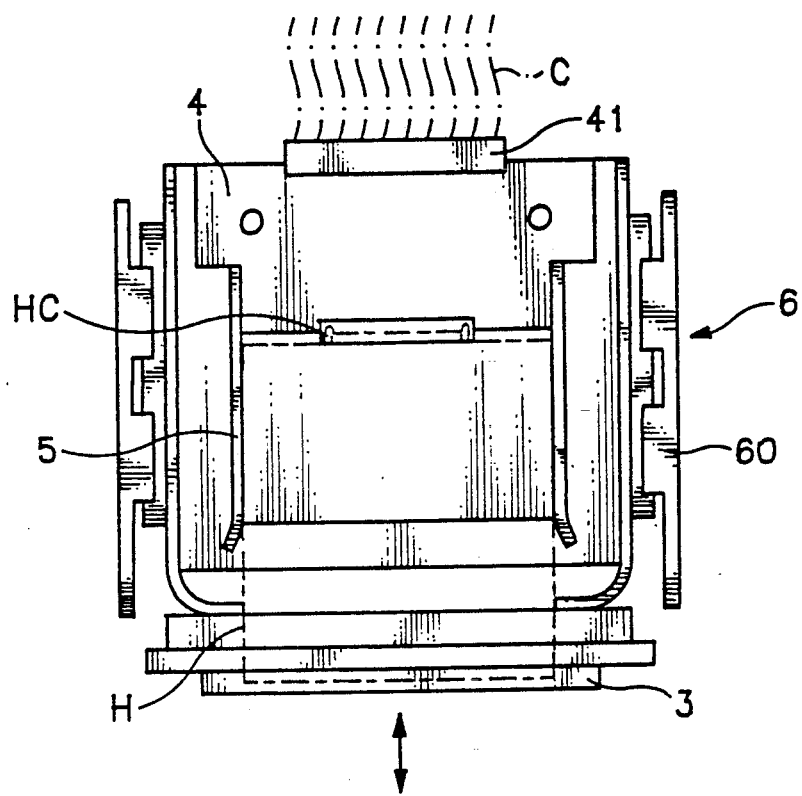
FIG. 2 is a plan view showing that a hard disk is inserted and removed by means of the hard disk compatible system depicted in FIG. 1.

With reference now to FIG. 2, the bracket 1 into which the above parts are assembled is fixed on a sash of the desk top computer, and inserted in a body 6 having a plurality of parties of guide rails 60. After that, controller connective lines C are connected with the connector 41 of the interface board 4 to fix the bracket 1.

Since the curved portions 20 formed in one side surface of the bracket guides 2 fitted in the bracket 1 are bent inward, the bracket 1 easily fits in the guide rails 60.

Figure 3:
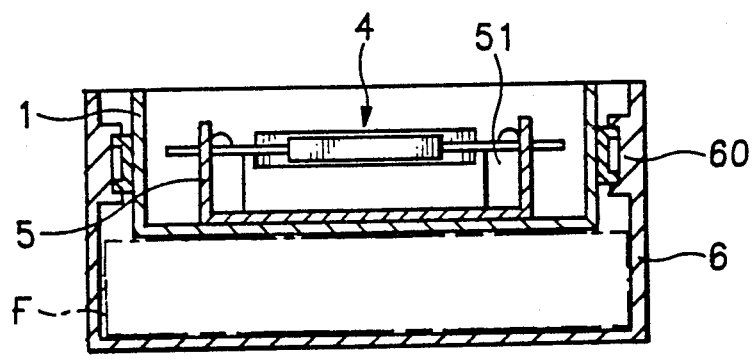
FIG. 3 is a sectional view of FIG. 2.

As shown in FIG. 3, after the bracket 1 is inserted to the upper surface of a floppy disk F in the body 6, the bracket guide 2 firmly goes in gear with the guide rails 60 in such a manner that the bracket 1 is fitted in the body 6.

If the hard disk H is inserted to the inserting portion 3 wherein the deck 30 is formed to be suitable for the size of the hard disk H for a notebook computer, the connectors HC of the hard disk H are combined with the connector 40 of the interface board whereby the information can be transmitted to a controller of the desk top computer.

In addition, if the hard disk is moved to the notebook computer, the exposed hard disk H exposed to outside formed in the inserting portion 3 is held by the recess 31 and then removed from the hard disk guide 5.

According to the present invention, the same information can be transferred between two different computers by moving, for example, a hard disk of the notebook computer to the desk top computer after the bracket for installing the hard disk guide and interface board formed suitably for the size of the hard disk is slidably fitted on the body fixed on the sash of the desk top computer.

Although the preferred embodiment of this invention has been described in detail hereinabove, it should be clearly understood that many variations and/or modifications of the basic inventive concepts may appear to those skilled in the pertinent art, which would still fall within the spirit and scope of the present invention, as defined in the appended claims.

What is claimed is:

1. A hard disk compatible system for a first computer and a second computer serving as a medium facilitating the direct interchange of information between the first computer and second computer, wherein the first and second computers have systems that are different, and wherein a need for duplicating data using an auxiliary memory unit is eliminated, the system comprising:

hard disk receiving means for receiving a hard disk from the first computer system to be compatible with the second computer system and connecting means for operatively connecting the hard disk receiving means to the second computer system, the hard disk receiving means having a bracket slidably fitted on a body having a plurality of pairs of guide rails fixed on a sash of the second computer, and including a bracket guide;

a hard disk guide attached to the inside of a vertical portion of said bracket, for supporting a hard disk of the first computer; and an inserting portion formed in the front side of said bracket, and including a deck to which a hard disk is inserted and a recess for removal of said hard disk; and the connecting means having an interface board fitting in a connective portion of said hard disk guide inside said bracket, and including connectors.

2. The hard disk compatible system as set forth in claim 1, wherein an expansion portion is formed on the opposite side of said connective portion of said hard disk guide to insert and remove easily a hard disk.

3. The hard disk compatible system as set forth in claim 1, wherein said bracket guide includes a curved portion bent inward on one side surface of said bracket guide that is first fitted in said bracket.

* * * * *

UNITED STATES PATENT AND TRADEMARK OFFICE
CERTIFICATE OF CORRECTION

PATENT NO. : 5,327,323
DATED : July 5, 1994
INVENTOR(S) : Yunpil Yeom; Keesoon Park It is certified that error appears in the above-indentified patent and that said Letters Patent is hereby corrected as shown below:

On title page, item

[54] Title, in the title change". . . INTEFACE BOARD" to -- INTERFACE BOARD --.

Column 1, line 1, in the title change ". . . INTEFACE BOARD" to -- INTERFACE BOARD --.

Column 1, line 34, change "casts" to -- costs --.

Column 1, line 48, change "other" to -- another --.

Column 1, line 62, change "system" to -- systems --.

Column 3, lines 18, 19, delete "exposed to outside formed" and insert therefor -- fitted --.

Signed and Sealed this

Thirty-first Day of January, 1995

Attest:

BRUCE LEHMAN

*Attesting Officer*  *Commissioner of Patents and Trademarks*